MAGNETIC MEMORY DEVICE PROVIDING CREEP CONTROL

Filed Oct. 1, 1963

INVENTOR
WILLIAM J. BARTIK

BY Rene A. Kuypers
ATTORNEY

United States Patent Office 3,436,739

Patented Apr. 1, 1969

3,436,739
MAGNETIC MEMORY DEVICE PROVIDING CREEP CONTROL

William J. Bartik, Jenkintown, Pa., assignor to Sperry Rand Corporation, New York, N.Y., a corporation of Delaware Filed Oct. 1, 1963, Ser. No. 313,123
Int. Cl. G11b 5/00
U.S. Cl. 340—174 7 Claims This invention relates in general to a plated wire or planar film memory device. More particularly, this invention relates to a technique for improving the performance of a plated wire or planar film memory by minimizing the effect of creep therein.

It has been observed during the recording cycle of a plated wire or planar film memory device that transverse fields emanating from a drive line or a word solenoid in combination with a digit field produced by a bit line cause an effect known as creep. Creep is defined as the gradual elongation of a magnetized section on a recording medium occurring during the recording cycle so that information stored in adjacent bit positions is destroyed or altered. As just mentioned, the phenomenon of creep in a plated wire or planar film memory interferes with adjacent bit positions, thereby eventually causing erroneous read out of information. The creep problem is particularly serious in the operation of a digital computer, since the latter functions by using discrete voltage pulses. In the event that these voltage pulses lose amplitude or are not well defined because of the creeping of adjacent bit positions, there is a tendency for the computer to lose accuracy and hence produce spurious results.

It is therefore an object of this invention to provide an improved data memory device.

It is a further object of this invention to provide an improved plated wire memory device.

It is still another object of this invention to provide an improved planar film memory device.

It is yet another object of this invention to provide a technique that will minimize the effect of creep in magnetic thin films.

It is a final object of this invention to provide a memory device that achieves high packing density.

In accordance with a feature of this invention, a device is provided to minimize creep in a plated wire or planar film (hereinafter, whenever a plated wire is discussed, a planar film embodiment will also be intended) memory device. The device includes means to apply a direct current (D.C.) bias in addition to the pulse current normally applied to energize a drive line. Applying a D.C. bias current to a drive line in addition to the pulse current results in retaining information stored in adjacent thin film locations rather than destroying it.

In accordance with another feature of this invention, the above mentioned D.C. bias current applied to each drive line results in a reduced pulse drive current for reading-out or writing-in information into a memory location of a plated wire memory. It follows that the reduced pulse drive current required to energize a drive line results in a reduced leakage field, thereby minimizing the effect of creep.

The novel features that are considered characteristic of this invention are set forth with particularity in the appended claims. The invention itself, however, both as to its organization and method of operation, as well as additional objects and features thereof, will best be understood from the following description when considered in conjunction with the accompanying drawings, wherein:

This invention operates to minimize creep by providing each drive line of a plated wire memory device with a D.C. bias. The D.C. bias is arranged in such a way so that the bias current in each drive line alternates in direction. The D.C. bias current present in each drive line slightly rotates the magnetization vectors at each bit position (i.e., the intersection of a drive line and a bit line) from their rest position along the "easy" axis toward the "hard" axis of magnetization.

By alternating the D.C. bias current in each drive line, the magnetization vectors at each bit position are slightly rotated from their rest position along the "easy" axis toward the "hard" axis of magnetization in opposing directions (i.e., as between three drive lines, for example, and the three bit positions associated therewith, if the bias current rotates the magnetization vectors of the first or left hand bit position toward the left of the "easy" axis, the second or middle bit position will have its magnetic vectors rotated to the right of the "easy" axis by the bias current, and the third bit position will have its magnetic vectors again rotated toward the left of the "easy" axis by the bias current). As will be discussed in more detail hereinafter, this slight rotation of the magnetization vectors at each bit position in opposing directions is such as to retain information in adjacent bit positions whenever a drive line is selectively energized, rather than to destroy it.

Thus, in the above mentioned three drive line example, if a pulse current is applied to the second or middle drive line in addition to the bias current and in the same direction as the bias current, an orthogonal magnetizing force is generated, thereby causing the magnetization vectors of the first bit position contiguous to the middle bit position to be rotated back into the normal position (i.e., a position without D.C. bias) along the "easy" axis; similarly, the magnetization vectors of the third bit position contiguous to the middle bit position are rotated back into their normal position (i.e., a position without D.C. bias) along the "easy" axis. In this manner, there is no opportunity for information stored in adjacent bit positions to be accidentally switched from, for example, a binary one into a binary zero.

The D.C. bias applied to each drive line produces other beneficial effects. Thus, for a given amount of voltage output from any bit position in a plated wire device, the total leakage field from an energized drive line will be accordingly less. Therefore, the reduction in the leakage field will not only permit energizing a drive line with less pulse current for a given amount of voltage output, but furthermore, the reduced leakage field will also permit obtaining greater packing density of the memory positions or memory elements, as well as minimizing the effect of creep.

Figure 1:
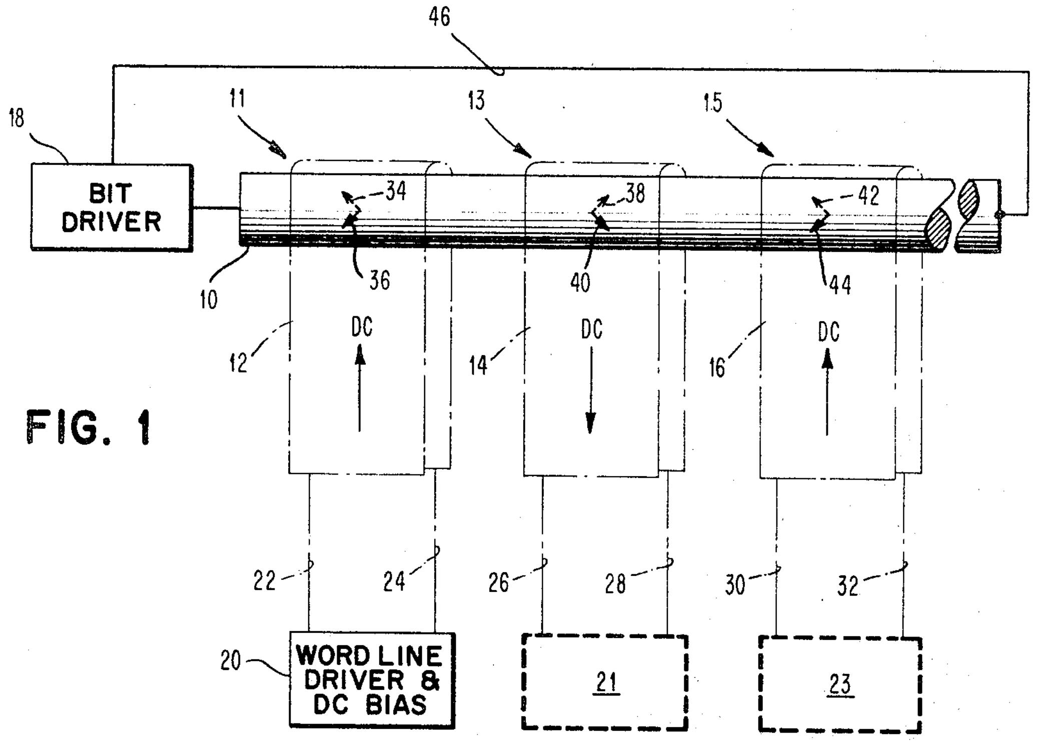
FIGURE 1 is a schematic representation of a plated wire memory embodiment which depicts the bias voltage and current applied to each drive line in accordance with this invention.

Referring to the drawings and in particular to FIGURE 1, a thin film-plated wire memory device is depicted. The plated wire 10 in a preferred embodiment is a five mil diameter beryllium copper wire substrate having a thin magnetic film formed on the surface thereof. The thin magnetic film is electroplated on the wire substrate with approximately a 10,000 Angstrom thickness of a Permalloy film (i.e., nickel-iron alloy). In a preferred embodiment, the Permalloy film is apuroximately 80% nickel and 20% iron. The Permalloy film is electroplated in the presence of a circumferential magnetic field that establishes a uniaxial anisotropy axis at right angles (i.e., around the circumference) to the longitudinal axis of the wire along its length. The uniaxial anisotropy establishes an "easy" and "hard" direction of magnetization (FIGURE 2) and the magnetization vectors of the thin film are normally oriented in one of two equilibrium positions along the "easy" axis, thereby establishing two bistable states necessary for binary logic operation. The plated wire 10 is connected at one end by appropriate means to a bit driver 18. The other end of the plated wire 10 is returned to the bit driver 18 by means of the connection 46, thereby establishing a continuous circuit path.

In a normal plated wire memory embodiment, the plated wire 10 also serves as a sense line and is connected by appropriate means to a sense amplifier (not shown for simplicity and ease of understanding). As is understood in the art, a sense amplifier is utilized to read out and interpret information stored in a plated wire memory device.

Placed substantially perpendicular and in juxtaposition to the plated wire 10 are the drive lines or word solenoids 12, 14 and 16. The intersection of the plated wire 10 and the drive lines 12, 14 and 16 determine the bit positions 11, 13 and 15 respectively. It should be noted that it is not necessary that the drive lines 12, 14 and 16 be exactly perpendicular to the plated wire 10 and hence, the plated wire and the drive lines may be skewed somewhat without seriously degrading the performance. Although FIGURE 1 depicts only a single plated wire 10, in a preferred embodiment there would be a plurality of plated wires similar to 10 oriented within the drive lines 12, 14 and 16. The number of plated wires within a drive line determine the number of bits per memory word and this latter factor determines the size of the memory. Each of the drive lines 12, 14 and 16 are connected by connections 22, 24, 26, 28, 30 and 32 to respective word line drivers 20, 21 and 23. Each of the word line drivers 20, 21 and 23 also incorporate a D.C. bias, which provides a D.C. current in each drive line 12, 14 and 16 in alternating directions as designated by the arrow. Each of the drive elements 12, 14 and 16 have a typical width dimension of 20 mils and are depicted in FIGURE 1 as being of a single-turn solenoid configuration. It should be understood however that other forms of the drive lines may be used as, for example, they may have a flat configuration, or they may take the form of a multi-turn solenoid in order to achieve closer coupling with the plated wire 10.

Figure 2:
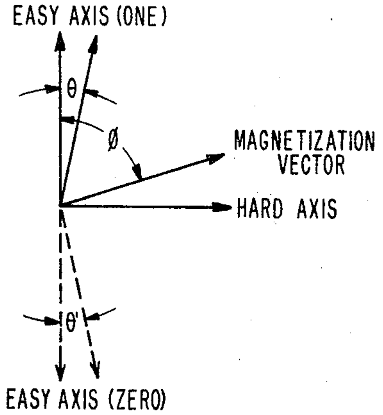
FIGURE 2 is a vector representation of the "easy" and "hard" axes of magnetization of the plated wire memory of FIGURE 1 as well as depicting the effect of the D.C. bias applied to a drive line.

The conditions of easy magnetization at each of the bit positions 11, 13 and 15 is represented by and referred to as a vector as shown in FIGURE 2 which in response to a D.C. bias can be rotated by some small angle $\theta$ and $\theta'$ from the "easy" binary one and the binary zero axes. The dotted vector representations 34, 38 and 42 designate that a binary one is stored at the bit positions 11, 13 and 15 respectively, whereas the solid vector representations 36, 40 and 44 represent that a binary zero is stored at each of the above mentioned bit positions. For ease of understanding, only one vector representation is shown for either a binary zero or a binary one at each of the bit positions 11, 13 and 15, however, it should be understood that there are a plurality of vectors extending the length of each bit position (i.e., the width of each of the drive lines). It should be further understood, that between each of the bit positions such as 11 and 13 there are many magnetization vectors, which may not be arranged uniformly, but rather may be arranged as binary zeros or binary ones in a haphazard manner.

As mentioned above, the magnetization vectors at each bit position, whether they be oriented as binary zeros or binary ones, can be rotated through a small angle $\theta$ or $\theta'$ from the "easy" axis by the D.C. bias. The magnetization vectors are rotated in alternating directions from a rest position along the "easy" axis toward the "hard" axis of magnetization because of the direction of the D.C. bias voltage applied to each drive line. The slight rotation through the angle $\theta$ or $\theta'$ is caused by the transverse magnetic field produced by the D.C. bias in accordance with Ampere's law and since the bias current in one drive line is in the opposite direction from the bias current in an adjacent drive line, the rotation of the magnetization vectors is correspondingly in opposite directions. Thus, considering the bit positions 11, 13 and 15, in order, and assuming that each bit position is magnetized as a binary one, it will be noted that the magnetization vector 34 is oriented toward the left, the magnetization vector 38 is oriented to the right, and the magnetization vector 42 is oriented toward the left.

In order to write new information into a certain bit position of the memory device depicted in FIGURE 1, it is necessary that pulse current is supplied selectively to the proper drive line and simultaneously, bit current of the proper polarity is supplied to the plated wire 10 by means of the bit driver 18. The presence of the bit current steers (i.e., adds the necessary additional movement) the magnetization vectors toward the desired "easy" axis orientation. After all bit and drive current is removed, the magnetization vector will relax to its rest position as determined by the D.C. bias and the information stored. The magnitude of the bit current in the plated wire 10 required for the write operation is small in comparison with the drive current because the current in the drive line rotates the magnetization vectors to almost 90 degrees from the "easy" axis and the bit current is only required to steer the magnetization vectors through the 90 degrees position.

It has been found that the leakage magnetic field from the drive current during the write cycle of the memory is the chief cause of creep in magnetic plated wires. If we consider the adjacent bit positions 11 and 15 as well as the bit position 13 and its associated drive line 14, it can be determined that the leakage field from the energized drive line 14 in combination with a maximum amplitude field in the bit line 10 can cause an eventual alteration of the information stored in either of the bit positions 11 or 15. In some cases, such alteration requires millions of cycles or more. Thus, if the bit position 13 required having a "one" written therein, represented by the magnetization vector 38, the flux from the drive current necessary for the "write-in" may cause bit positions 11 and 15, which have stored binary zeros represented by vectors 36 and 44, to be switched into binary ones represented by vectors 34 and 42.

In accordance with the method devised by the instant invention, that it, applying a D.C. current in the same direction as the pulse current to each drive line, it is highly unlikely if not impossible for the effective leakage field from the pulse current, for example, in drive line 14 to alter the information stored in adjacent bit positions 11 and 15. The foregoing is true because the influence of the leakage field emanating from drive line 14 upon bit positions 11 and 15 is substantially cancelled by the D.C. field produced by the bias current flowing in drive lines 12 and 16. This result may be expressed mathematically by $$H_{(\text{leakage field})}-H_{\text{D.C.}}=0$$

where H is the symbol for the magnetic field. In other words, because the magnetization vectors at adjacent bit positions 11 and 15 are slightly rotated by the D.C. bias voltage, the pulse leakage field from the energized drive line 14 causes the adjacent vectors to be rotated back to a position nearly perpendicular to the longitudinal axis of the plated wire 10.

Another beneficial effect may also be obtained in view of the D.C. bias applied to each drive line. Thus, the total orthogonal magnetizing field required to obtain a given amount of voltage output from a bit position along the plated wire will be less with D.C. bias and hence, the leakage field will correspondingly be less. This effect can readily be seen by referring to Formula 1 below wherein the output signal produced by a plated wire device is equal to $$V=1-\cos\phi \qquad (1)$$

where $$\phi=\sin^{-1}\frac{h}{h_k}$$

and $h$ equals the applied word field; $h_k$ equals the field for a 90 degree rotation (i.e., the anisotropy field). The voltage output expressed by (1) changes very slowly for small angles of $\phi$. However, if $h$ is approximately equal to $h_k$, then the angle $\phi$ approaches 90 degrees and this value substituted in (1) indicates that a large voltage output is obtained. On the other hand, if $h$ is approximately equal to 0, the angle $\phi$ is near 0 degrees and the voltage output is very small. In other words, if the slow moving angular region (i.e., small angles of $\phi$ equal to $\theta$) can be eliminated by the D.C. bias, then less pulse current will have to be applied to the drive lines for a given amount of voltage output.

Figure 3:
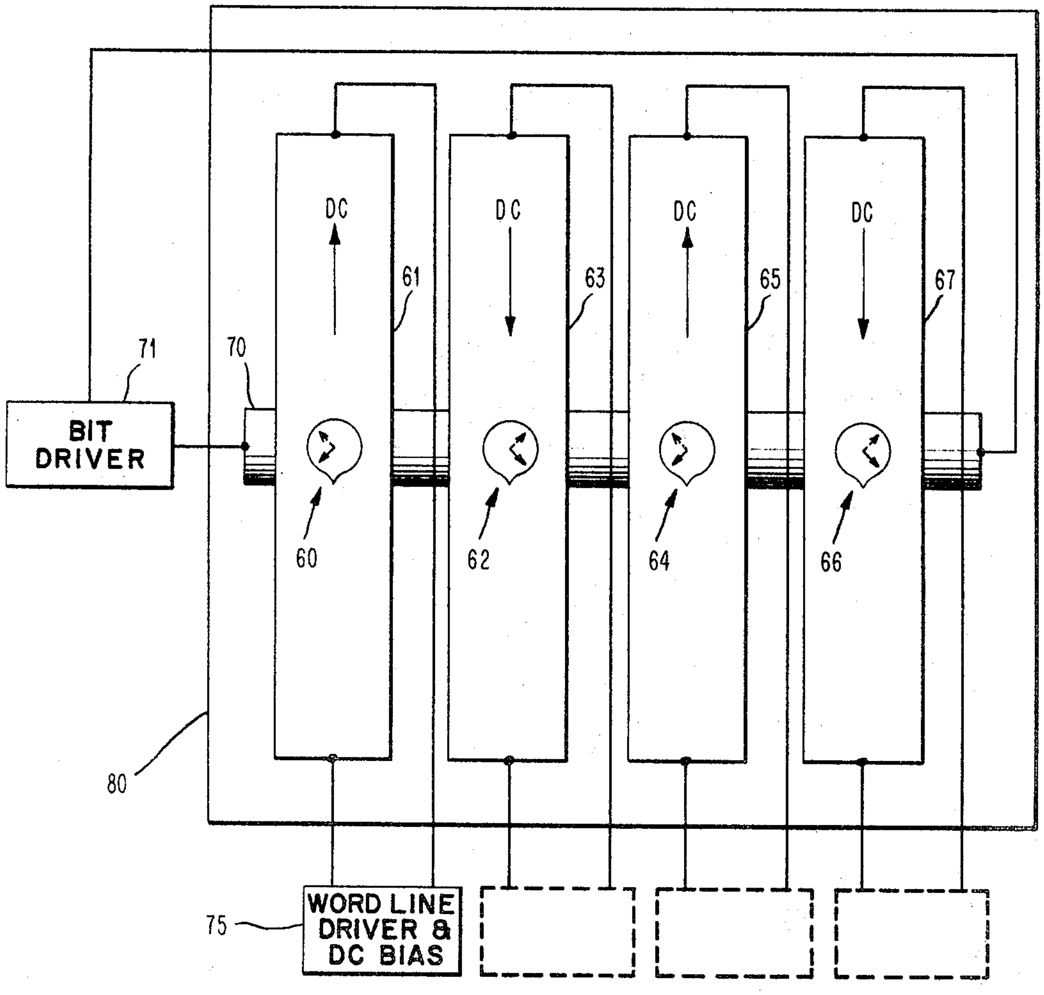
FIGURE 3 is a schematic representation of planar film memory device.

This invention has been described with relation to a plated wire memory device, but as mentioned in an earlier paragraph, its application is readily adaptable to a planar film memory device, such as shown in FIGURE 3. As is well known in the art, a distinction between a plated wire and a planar film memory device is that the latter utilizes Permalloy thin film spots, 60, 62, 64 and 66, which are deposited on a flat substrate material 80 in the presence of a circumferential magnetic field, thereby establishing the required uniaxial anisotropy. It is also the practice in a planar film device to provide a narrow bit line overlay 70 over the thin film spots which is connected to the bit driver 71. The bit line overlay and the bit driver are grounded to indicate a continuous circuit path. The word line driver 61 is connected to the word driver 75 in a similar manner as the drive lines depicted in FIGURE 1. Furthermore, a sense line overlay (not shown) is included in a complete planar film device. On the other hand, a plated wire memory as shown in FIGURE 1 provides a continuous plating of a Permalloy film on a small diameter wire. However, despite these small differences, a D.C. bias may readily be applied to each drive line overlay 61, 63, 65 and 67 of the planar film device (FIGURE 3) in accordance with the instant invention. It should be understood therefore that the operation of the two embodiments are similar.

In summary, this invention relates to a technique wherein the effect of creep in plated wire or planar film memory is minimized. This is accomplished by applying a D.C. bias current to adjacent drive lines of the memory in an opposite direction. This technique rotates the magnetization vectors of each magnetized section from the normal rest position along the "easy" axis of magnetization to a new angle slightly removed from the "easy" axis. This rotation of the magnetization vectors of adjacent thin film spots is in such a direction that when an orthogonal magnetizing force is applied to any thin film spot during a writing cycle of the memory, the two adjacent thin film spot areas will be rotated back into the normal rest positions along the "easy" axis (i.e., perpendicular to the longitudinal axis of the wire).

Obviously many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. The memory arrangement comprising:

(a) a plurality of data storage elements;

(b) a plurality of flux generator means disposed in close proximity to said data storage elements, each different generator means being juxtaposed to a different one of said storage elements and, (c) each said generator means being connected to an energizing means to generate a first magnetic field at said respective storage element;

(d) said magnetic field at a respective storage element being oriented in an opposite direction from the magnetic field at a next adjacent storage element;

(e) means further connected to each said flux generator means to selectively generate a second magnetic field at each said respective storage elements concurrent with but after the application of said first magnetic field;

(f) said second magnetic field being in the same direction as said first magnetic field.

2. The memory arrangement comprising:

(a) a plurality of data storage elements having an easy and hard axes of magnetization;

(b) a plurality of conductor means, each different conductor disposed in close proximity to a different one of said storage elements;

(c) means for energizing said conductor means with a bias signal to rotate the magnetization vectors at at each said data storage element through a small angle removed from said easy axes;

(d) said vectors at each said data storage element being rotated from said easy axes in an opposite direction from an adjacent data storage element;

(e) means for selectively energizing said conductor means with a transitory signal to further rotate said magnetization vectors of said data storage elements toward the hard axis of magnetization;

(f) the current in said conductor means produced by said bias signal and said transitory signal being in the same direction.

3. A memory arrangement comprising:

(a) a signal conducting means having a thin magnetic film plated on the surface thereof, said thin film having the property of uniaxial anisotropy;

(b) at least first and second flux generator means disposed in close proximity to said signal conducting means including said thin film, the intersection of said signal conducting means and said first and second generator means forming, respectively, first and second bit positions, respectively;

(c) means connected to said first and second flux generator means to generate a first magnetic field at said bit positions, the direction of said magnetic field at a respective bit position being in an opposite direction from the magnetic field at the next adjacent bit position;

(d) means further connected to said first and second flux generator means to selectively generate a second magnetic field at a respective bit position which is in the same direction as said first mentioned magnetic field;

(e) said second field being applied concurrently with but after the application of said first magnetic field.

4. The memory combination comprising:

(a) a wire having a ferromagnetic coating, said coating having the property of unaxial anisotropy;

(b) a plurality of conductor means juxtaposed to said wire including said coating;

(c) means for selectively energizing respective ones of said plurality of conductor means for a memory record cycle;

(d) said energizing means causing a first current to be generated in opposite directions in adjacent conductor means;

(e) means for generating a second current in a first or second direction in said wire in substantial coincidence with said first current for causing information to be recorded on said wire.

5. The memory arrangement comprising, (a) a plurality of data storage elements having an easy and hard axes of magnetization;

(b) a plurality of flux generator means disposed in close proximity to said data storage elements, different generator means being juxtaposed to a different one of said elements and, (c) each said generator means being connected to an energizing means to produce a first magnetic field at said respective storage element to rotate the magnetization vectors thereof through a small angle removed from said easy axis to provide a biased position;

(d) said vectors at each said data storage element being rotated from said easy axis in an opposite direction from those of an adjacent data storage element;

(e) means for selectively energizing said conductor means with a transitory signal to further rotate said magnetization vectors toward said hard axis of magnetization from said biased position;

(f) said transitory signal causing said magnetization vectors of said adjacent storage elements to be momentarily rotated back to said easy axis.

6. The memory arrangement in accordance with claim 5 wherein said means for biasing a data storage element comprises a direct current signal.

7. The memory arrangement in accordance with claim 6 wherein said means for providing a transitory signal comprises an alternating current pulse.

References Cited

UNITED STATES PATENTS

| | | | |
|---|---|---|---|
| 3,105,962 | 10/1963 | Bobeck | 340—174 |
| 3,133,271 | 5/1964 | Clemons | 340—174 |
| 3,295,115 | 12/1966 | Synder | 340—174 |
| 3,000,004 | 9/1961 | Weller | 340—174 |
| 3,011,158 | 11/1961 | Rogers | 340—174 |
| 3,245,057 | 4/1966 | Downing | 340—174 |

FOREIGN PATENTS

| | | |
|---|---|---|
| 937,776 | 9/1963 | Great Britain. |

STANLEY M. URYNOWICZ, *Primary Examiner.*